(12) United States Patent
Yamadaya et al.

(10) Patent No.: US 8,323,745 B2
(45) Date of Patent: Dec. 4, 2012

(54) APPLICATION LIQUID AND METHOD FOR FORMATION OF A SILICA-BASED COATING FILM USING THE APPLICATION LIQUID

(75) Inventors: Tokonori Yamadaya, Kawasaki (JP); Kiyoshi Ishikawa, Kawasaki (JP); Atsushi Sawano, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 330 days.

(21) Appl. No.: 12/748,146

(22) Filed: Mar. 26, 2010

(65) Prior Publication Data
US 2010/0247799 A1     Sep. 30, 2010

(30) Foreign Application Priority Data
Mar. 31, 2009   (JP) .................................. 2009-087060

(51) Int. Cl.
*B05D 3/02*  (2006.01)

(52) U.S. Cl. .............. 427/387; 528/21; 549/13; 549/23; 549/26; 552/208

(58) Field of Classification Search ........................ None
See application file for complete search history.

(56) References Cited

U.S. PATENT DOCUMENTS
2005/0239953 A1* 10/2005 Sakurai et al. ............... 524/588

FOREIGN PATENT DOCUMENTS
JP   2007-254677    10/2007
JP   2008-247747 A  * 10/2008

OTHER PUBLICATIONS
Abstract for JP 2008-247747.*
Machine-generated translation into English of JP 2008-247747.*

* cited by examiner

*Primary Examiner* — Marc Zimmer
(74) *Attorney, Agent, or Firm* — Knobbe Martens Olson & Bear LLP (57) ABSTRACT

An application liquid capable of forming a dense silica-based coating film even when embedded into a fine groove, and a method for formation of a silica-based coating film using the application liquid are provided. An application liquid is used including (A) a siloxane polymer, and (B) a base generator represented by the following general formula (I):

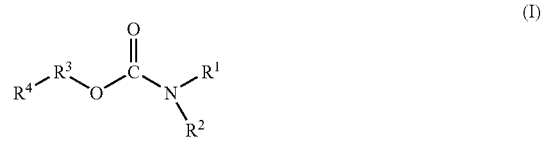

(I)

wherein, $R^1$ and $R^2$ are a hydrocarbon group having 1 to 5 carbon atoms and which may be the same or different; or one of $R^1$ and $R^2$ is a hydrogen atom and the other is a hydrocarbon group having 1 to 5 carbon atoms; when $R^1$ and $R^2$ are both a hydrocarbon group, these may bind to one another to form a ring structure; $R^3$ is a linking group; and $R^4$ is a condensed ring.

5 Claims, 6 Drawing Sheets

APPLICATION LIQUID AND METHOD FOR FORMATION OF A SILICA-BASED COATING FILM USING THE APPLICATION LIQUID

This application is based on and claims the benefit of priority from Japanese Patent Application No. 2009-087060, filed on 31 Mar. 2009, the content of which is incorporated herein by reference.

BACKGROUND OF THE INVENTION

1. Field of the Invention

The present invention relates to an application liquid for forming a silica-based coating film, and a method for formation of a silica-based coating film using the application liquid.

2. Related Art

Silica-based coating films constituted with $SiO_2$ as a principal component have been used as pre-metal dielectric (PMD) films for semiconductor devices, or as element isolation insulation films formed in STI (Shallow Trench Isolation) grooves.

Such pre-metal dielectric films and the like are generally formed by reflowing at high temperatures after CVD; however, a method of using an application liquid that contains a siloxane polymer was investigated, and has been practiced in recent years. The method of using such an application liquid is advantageous in that a silica-based coating film can be formed by baking at a lower temperature than the temperature of the aforementioned reflowing, and also the surface of the coating film is superior in flatness.

Patent Document 1: Japanese Unexamined Patent Application No. 2007-254677

SUMMARY OF THE INVENTION

Meanwhile, as miniaturization of semiconductor devices markedly advances as in recent years, it becomes necessary to embed an application liquid into fine grooves for formation of the pre-metal dielectric films and device isolation insulation films. However, when an application liquid is embedded into such fine grooves, the application liquid at the groove bottom is not completely converted into $SiO_2$ due to influences from oxygen deficiency and the like, leading to a problem of failure in forming a dense silica-based coating film.

In the case of pre-metal dielectric films, in particular, contact holes are formed in the pre-metal dielectric film, and the inner side is washed with hydrofluoic acid. When a dense silica-based coating film is not formed as described above, a problem of etching the silica-based coating film at the corresponding portion in a horizontal direction with respect to the substrate, i.e., side etching, generally referred to may be caused.

In a known method for forming a dense silica-based coating, an application liquid containing a siloxane polymer, and a compound that generates an acid or base by the action of heat is used (Patent Document 1). However, still even with such an application liquid, formation of a dense silica-based coating film at a groove bottom has failed, when it is embedded into a fine groove.

The present invention was made in order to solve the foregoing problems, and an object of the invention is to provide an application liquid capable of forming a dense silica-based coating film even when embedded into a fine groove, and a method for formation of a silica-based coating film using the application liquid.

The present inventors have thoroughly investigated focusing attention on an additive to be added to an application liquid in order to solve the above described problems. As a result, the inventors have found that the aforementioned problems can be solved by adding a specific base generator to an application liquid, and have completed the present invention. More specifically, the present invention provides the following.

According to a first aspect of the present invention, an application liquid is provided including (A) a siloxane polymer, and (B) a base generator represented by the following general formula (I):

wherein, $R^1$ and $R^2$ are a hydrocarbon group having 1 to 5 carbon atoms and which may be the same or different; or one of $R^1$ and $R^2$ is a hydrogen atom and the other is a hydrocarbon group having 1 to 5 carbon atoms; when $R^1$ and $R^2$ are both a hydrocarbon group, these may bind to one another to form a ring structure; $R^3$ is a bivalent linking group; and $R^4$ is a condensed ring.

According to a second aspect of the present invention, a method for formation of a silica-based coating film is provided including: an applying step of applying the application liquid of the present invention on a substrate to form an applied film; a heating step of heating the applied film; and a baking step of baking the applied film after the heating step to form a silica-based coating film.

According to the present invention, a dense silica-based coating film can be formed even though an application liquid is embedded into a fine groove.

DETAILED DESCRIPTION OF THE INVENTION

Hereinafter, embodiments of the present invention will be explained.

Application Liquid

The application liquid of the present invention contains (A) a siloxane polymer, and (B) a specific base generator.

(A) Siloxane Polymer

The siloxane polymer (hereinafter, also referred to as "(A) component") used in the present invention is not particularly limited, and is acceptable as long as it is a polymer having an Si—O—Si bond. Among the siloxane polymers, a hydrolytic condensate of alkoxysilane can be suitably used. Although the alkoxysilane is not particularly limited, for example, compounds represented by the following general formula (a) can be exemplified:

wherein, $R^5$ is a hydrogen atom, or an alkyl group or an aryl group having 1 to 20 carbon atoms; $R^6$ is a monovalent organic group; and n represents an integer of 0 to 2.

Wherein, the monovalent organic group may be, for example, an alkyl group, an aryl group, an allyl group, a glycidyl group or the like. Among these, preferred are an alkyl group and an aryl group. Especially preferred is the alkyl group having 1 to 5 carbon atoms, such as e.g., a methyl group, an ethyl group, a propyl group and a butyl group. Also, the alkyl group may be linear or branched, and may include substitution of hydrogen atom with a fluorine atom. The aryl group preferably has 6 to 20 carbon atoms, such as e.g., a phenyl group and a naphthyl group.

Specific examples of the compound represented by the above general formula (a) are as follows:

(a1) in the case of n=0, the examples include tetramethoxysilane, tetraethoxysilane, tetrapropoxysilane, tetrabutoxysilane, and the like;

(a2) in the case of n=1, the examples include monoalkyltrialkoxysilane such as monomethyltrimethoxysilane, monomethyltriethoxysilane, monomethyltripropoxysilane, monoethyltrimethoxysilane, monoethyltriethoxysilane, monoethyltripropoxysilane, monopropyltrimethoxysilane and monopropyltriethoxysilane, monophenyltrialkoxysilane such as monophenyltrimethoxysilane and monophenyltriethoxysilane, and the like;

(a3) in the case of n=2, the examples include dialkyldialkoxysilane such as dimethyldimethoxysilane, dimethyldiethoxysilane, dimethyldipropoxysilane, diethyldimethoxysilane, diethyldiethoxysilane, diethyldipropoxysilane, dipropyldidimethoxysilane, dipropyldiethoxysilane and dipropyldipropoxysilane, diphenyldialkoxysilane such as diphenyldimethoxysilane and diphenyldiethoxysilane, and the like.

In the application liquid of the present invention, the siloxane polymer (A) has a mass average molecular weight of preferably 200 to 50,000, and more preferably 1,000 to 3,000. When the mass average molecular weight falls within this range, the coating properties of the application liquid can be improved.

The hydrolytic condensation of the alkoxysilane is carried out by allowing the alkoxysilane that serves as a polymerization monomer to react in the presence of an acid catalyst or a base catalyst in an organic solvent. With respect to the alkoxysilane as the polymerization monomer, it may be used alone or in combination of two or more to allow for condensation.

Moreover, trialkylalkoxysilane such as trimethylmethoxysilane, trimethylethoxysilane, trimethylpropoxysilane, triethylmethoxysilane, triethylethoxysilane, triethylpropoxysilane, tripropylmethoxysilane and tripropylethoxysilane, triphenylalkoxysilane such as triphenylmethoxysilane and triphenylethoxysilane, or the like may be added during hydrolysis.

The degree of hydrolysis of alkoxysilane, which is a prerequisite of the condensation, can be adjusted by the quantity of water to be added. Generally, water at the proportion of preferably 1.0 to 10.0 times by mole, and more preferably 1.5 to 8.0 times by mole, is added to the total mol of alkoxysilane represented by the above formula (a). When the quantity of water to be added is not less than 1.0 times by mole, it is possible to sufficiently increase the degree of hydrolysis and to facilitate the coating film-formation. On the other hand, it is possible to improve storage stability by suppressing gelation when the quantity of water is not more than 10.0 times by mole.

In addition, upon condensation of the alkoxysilane represented by the general formula (a), an acid catalyst is preferably used. The acid catalyst is not particularly limited, and any one of conventionally used organic acids and inorganic acids can be employed. Examples of the organic acid include organic carboxylic acids such as acetic acid, propionic acid and butyric acid, and examples of the inorganic acid include hydrochloric acid, nitric acid, sulfuric acid, phosphoric acid, and the like. The acid catalyst may be directly added to a mixture of alkoxysilane and water, or may be added as an acidic aqueous solution with water to be added to alkoxysilane.

The hydrolysis reaction is usually completed in about 5 to 100 hours. Also, the reaction time required to complete the hydrolysis reaction can be reduced by allowing for the reaction through adding an aqueous acid catalyst solution dropwise to an organic solvent containing at least one alkoxysilane represented by the general formula (a), at a heating temperature between a room temperature and an elevated temperature not exceeding 80° C. The hydrolyzed alkoxysilane thereafter causes a condensation reaction to form a network of Si—O—Si as a result.

(B) Base Generator

The base generator (B) used in the present invention is represented by the following general formula (I).

$R^1$ and $R^2$ in the above general formula (I) are a hydrocarbon group having 1 to 5 carbon atoms which may be the same or different; or one of $R^1$ and $R^2$ is a hydrogen atom and another is a hydrocarbon group having 1 to 5 carbon atoms. The hydrocarbon group having 1 to 5 carbon atoms is preferably a linear or branched alkyl group having 1 to 5 carbon atoms. In addition, the ring structure formed by binding between $R^1$ and $R^2$ is preferably a ring structure formed from 2 to 8 carbon atoms, and for example, azacycloalkane ring structures such as an aziridine ring, an azetidine ring, a pyrrolidine ring and a piperidine ring may be exemplified. Among these, a piperidine ring is particularly preferred.

$R^3$ in the above general formula (I) is a bivalent linking group. Examples of the bivalent linking group include linear or branched alkylene groups having 1 to 5 carbon atoms, and groups represented by —C≡C—$R^7$—, wherein $R^7$ is a linear or branched alkylene group having 1 to 5 carbon atoms. Among these, a methylene group is particularly preferred.

$R^4$ in the general formula (I) is a condensed ring. The condensed ring may include a heteroatom. Among the condensed rings, those including 2 to 4 condensed ring structures, such as a naphthalene ring, a phenanthrene ring, an anthracene ring, a pyrene ring, a naphthacene ring, a benzoanthracene ring, a thioxanthene ring and an anthraquinone ring are preferred, and an anthracene ring, a thioxanthene ring and an anthraquinone ring are particularly preferred. In addition, the condensed ring may also have a substituent such as an alkyl group having 1 to 5 carbon atoms, a hydroxy group, a nitro group and an oxygen atom (=O).

The base generator (B) used in the present invention is not particularly limited as long as it is represented by the above general formula (I). As the base generator represented by the above general formula (I), for example, compounds represented by the following formulae (I-a) to (I-k) may be exemplified. Among these, the compound represented by the following formula (I-d) is particularly preferred.

(I-k)

By using the base generator (B) represented by the above general formula (I), a hydrogen atom moiety of Si—H, and an alkoxy group moiety of the siloxane polymer can be replaced with a hydroxy group. Condensation of hydroxy groups in polysiloxane that occurs during baking the applied film on the substrate results in formation of a Si—O—Si network.

In addition, according to the present invention, a base generator represented by the above general formula (I) is used. Thus, a hydrogen atom of Si—H, and an alkoxy group moiety of the siloxane polymer can be replaced with a hydroxy group in an amount sufficient for forming a dense Si—O—Si network. Consequently, silica-based coating films having a dense Si—O—Si network can be obtained even in the case of silica-based coating films formed on a groove having an extremely small width such as those having, for example, a depth of 100 to 500 nm and a width of 20 to 150 nm. In addition, even though the silica-based coating film is formed on an extremely fine wiring pattern, a silica-based coating film having a dense Si—O—Si network can be obtained.

The content of the base generator (B) in the application liquid of the present invention is preferably 0.1 to 20% by mass in terms of an equivalent mass of $SiO_2$ of the siloxane polymer (A). The content of the base generator (B) in the application liquid is more preferably 0.5 to 10% by mass. As described above, a dense Si—O—Si network is formed by condensation of hydroxy groups included in polysiloxane; however, the efficiency of base generation by the base generator is adjusted to be in an appropriate range when the content of the base generator (B) falls within the above range, whereby a further denser Si—O—Si network is formed.

Other Components

The application liquid of the present invention may contain other components in a range that does not impair the effects of the present invention. The other components which may be contained in the application liquid of the present invention can be exemplified as a surfactant, a solvent, and the like.

Surfactant

It is preferable to include a surfactant in the application liquid of the present invention. It is possible to improve application properties and spreading properties to the substrate by the presence of the surfactant.

Solvent

From the perspective of achieving improved coating properties and uniform film thickness, it is preferable that the application liquid of the present invention contains a solvent. As the solvent, any organic solvent which has been conventionally used can be employed. Specific examples include monohydric alcohols such as methyl alcohol, ethyl alcohol, propyl alcohol, butyl alcohol, 3-methoxy-3-methyl-1-butanol and 3-methoxy-1-butanol; alkyl carboxylate such as methyl-3-methoxypropionate and ethyl-3-ethoxypropionate; polyhydric alcohols such as ethylene glycol, diethylene glycol and propylene glycol; polyhydric alcohol derivatives such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, propylene glycol dimethyl ether, ethylene glycol monomethyl ether acetate, ethylene glycol monoethyl ether acetate, propylene glycol monomethyl ether acetate and propylene glycol monoethyl ether acetate; fatty acids such as acetic acid and propionic acid; and ketones such as acetone, methylethylketone and 2-heptanone, and the like. Of these, alcohol-based, or glycol-based solvents are preferably used. In addition, these organic solvents may be used alone, or two or more of them may be used in combination.

Although the amount of the solvent is not particularly limited, the concentration of the components other than the solvent (solid content) is preferably 5 to 100% by mass, and more preferably 20 to 50% by mass. By adjusting to fall within this range, the coating properties can be improved.

Others

Moreover, in the present invention, it is possible to include other resins, additives and the like in a range that does not impair the effects of the invention.

Method for Formation of a Silica-Based Coating Film

The method for formation of a silica-based coating film of the present invention includes: an applying step of applying the application liquid of the present invention on a substrate to form an applied film, a heating step of heating the applied film; and a baking step of baking the applied film after the heating step to form a silica-based coating film. According to the method for formation of a silica-based coating film of the present invention, formation of an extremely dense silica-based coating film is enabled by using the application liquid of the present invention.

It is preferred that the method for formation of a silica-based coating film of the present invention further has between the applying step and the heating step an irradiating step of irradiating an ultraviolet ray on the application liquid which had been applied on the substrate. The irradiating step is preferably carried out because a still denser Si—O—Si network can be formed.

Applying Step

The applying step refers to a step of applying the application liquid of the present invention on a substrate, thereby forming an applied film. As the method for applying the application liquid on a substrate to form an applied film, any method such as, for example, a spray-coating method, a spin-coating method, a dip-coating method, a roll-coating method, or a slit-coating method may be employed, and a spin-coating method is usually employed.

Examples of the substrate to which the application liquid of the present invention is applied include semiconductors, glasses, ceramics, metals and the like. Furthermore, the aforementioned substrate may also include those obtained by forming other layer such as a mask member on a substrate.

Irradiating Step

The irradiating step is a step of irradiating an ultraviolet ray on the applied film which had been formed on the substrate in the applying step. By irradiating the ultraviolet ray onto the applied film, a base is generated from the base generator prior to condensation of the hydroxy groups in polysiloxane that occurs during the baking, whereby the hydrogen atom of Si—H, and an alkoxy group in the siloxane polymer can be converted into a hydroxy group. By thus converting the hydrogen atom of Si—H, and an alkoxy group in the siloxane polymer into a hydroxy group prior to the condensation, a silica-based coating film having a still denser Si—O—Si network can be formed. Degradation (base generation) temperatures of the base generators are usually 200 to 250° C.

Therefore, the aforementioned reaction occurs even though the ultraviolet ray irradiation is not carried out. However, when the heating is started from a high temperature (no lower than 200° C.), the coating film is hardened from the upper layer, and thus oxygen fails to penetrate into the bottom. As a result, the aforementioned reaction at the bottom can be adversely affected. As in the foregoing, carrying out the irradiating step is preferred in the present invention.

Although the wavelength of the ultraviolet ray to be irradiated is not particularly limited, it is preferably 100 to 1,000 nm, and more preferably 150 to 600 nm. In addition, the illuminance of the ultraviolet ray to be irradiated (ultraviolet illuminance) is not particularly limited, but is preferably 10 to 1,000 mW/cm$^2$, and more preferably 20 to 800 mW/cm$^2$.

It is preferred that irradiation of the ultraviolet ray be carried out while heating because a residual solvent in the coating film can be removed, thereby improving the reaction efficiency. When the applied film is irradiated with an ultraviolet ray while heating, the applied film is heated preferably at 25 to 400° C., and more preferably at 80 to 200° C.

Conditions such as the ultraviolet light source, the ultraviolet ray irradiation distance and the ultraviolet ray irradiation time are not particularly limited, and they may be modified appropriately depending on the material used.

Heating Step

The heating step is a step of heating the applied film formed on the substrate after the applying step. The heating step is carried out for volatilizing the solvent and the like from the applied film, thereby drying the applied film. The condensation reaction of the hydroxy groups included in polysiloxane proceeds during this heating.

Although the heating temperature in the heating step is not particularly limited, it is preferably 80 to 300° C., and more preferably 100 to 200° C. In addition, also the heating time is not particularly limited, and is preferably 10 to 300 sec, and more preferably 60 to 180 sec.

The heating step may be carried out stepwise such that three or more steps are conducted. According to a specific example, a first baking is conducted on a hot plate of about 60 to 150° C. in ambient air or under an inert gas atmosphere such as nitrogen for about 30 sec to 2 min, a second baking is thereafter conducted at about 100 to 220° C. for about 30 sec to 2 min, followed by a third baking conducted at about 150 to 300° C. for about 30 sec to 2 min.

Baking Step

The baking step is a step for forming a silica-based coating film by baking the applied film after heating. In the baking step, the condensation reaction of the hydroxy groups included in polysiloxane is allowed to proceed, thereby forming a dense Si—O—Si network. Also during the aforementioned heating step, as well as the irradiating step carried out while heating, the condensation reaction of the hydroxy groups included in polysiloxane proceeds, but the condensation reaction can further proceed in this baking step.

Although the baking temperature in the baking step is not particularly limited, it is preferably 300 to 1,200° C., and more preferably 400 to 600° C. Also, the baking time is not particularly limited, which is preferably 10 min to 7 hrs, and more preferably 30 min to 2 hrs.

EXAMPLES

The present invention is described in more detail by way of Examples, but the present invention is not limited thereto.

Example 1

To a spin-on glass material containing a hydrolytic product of trialkoxysilane as a principal component adjusted to have a certain solid content using propylene glycol dimethyl ether as a solvent (OCDT-121500-V (trade name): manufactured by Tokyo Ohka Kogyo Co., Ltd., solid content in terms of an equivalent to SiO$_2$: 15% by mass) was added the aforementioned base generator (I-d) (manufactured by Wako Pure Chemical Industries, Ltd.) in an amount of 1% by mass relative to the solid content in the spin-on glass material to prepare an application liquid. The application liquid was applied using a coater (SS8261NUU: manufactured by Tokyo Ohka Kogyo Co., Ltd.) with a rotation number of 1,000 rpm on a TEG (Test Elementary Group) substrate formed with a groove having a width of 100 nm and a depth of 300 nm, whereby an applied film was formed on the TEG substrate.

Using a low-pressure mercury lamp (LH3201N (trade name): manufactured by GS YUASA Corporation), an ultraviolet ray was irradiated onto the application liquid on the TEG substrate under conditions of: main ultraviolet ray wavelengths of 185 and 254 nm; ultraviolet illuminance of 35 mW/cm$^2$; ultraviolet ray irradiation distance of 40 mm; ultraviolet ray irradiation time of 90 sec; and temperature environment of 150° C. Next, the applied film after irradiation of the ultraviolet ray was heated on a hot plate at 200° C. for 60 sec, to volatilize the solvent and the like included in the applied film, thereby drying the applied film. The applied film after drying had a film thickness of 7,000 Å. Furthermore, the applied film following the heating step under a condition of 550° C. for 1 hour was baked, and thus a silica-based coating film was formed on the TEG substrate.

Example 2

A silica-based coating film was formed in a similar manner to Example 1 except that the base generator was changed from the compound represented by the above formula (I-d) to a compound represented by the above formula (I-a) (manufactured by Wako Pure Chemical Industries, Ltd.).

Example 3

A silica-based coating film was formed in a similar manner to Example 1 except that the base generator was changed from the compound represented by the above formula (I-d) to a compound represented by the above formula (I-i) (manufactured by Wako Pure Chemical Industries, Ltd.).

Example 4

A silica-based coating film was formed in a similar manner to Example 1 except that the base generator was changed from the compound represented by the above formula (I-d) to a compound represented by the above formula (I-k) (manufactured by Wako Pure Chemical Industries, Ltd.).

Comparative Example 1

A silica-based coating film was formed in a similar manner to Example 1 except that the base generator was not used.

Comparative Example 2

A silica-based coating film was formed in a similar manner to Example 1 except that the base generator was changed from the compound represented by the above formula (I-d) to a compound represented by the following formula (II).

(II)

Evaluation of Film Forming Property

Figure 1A:
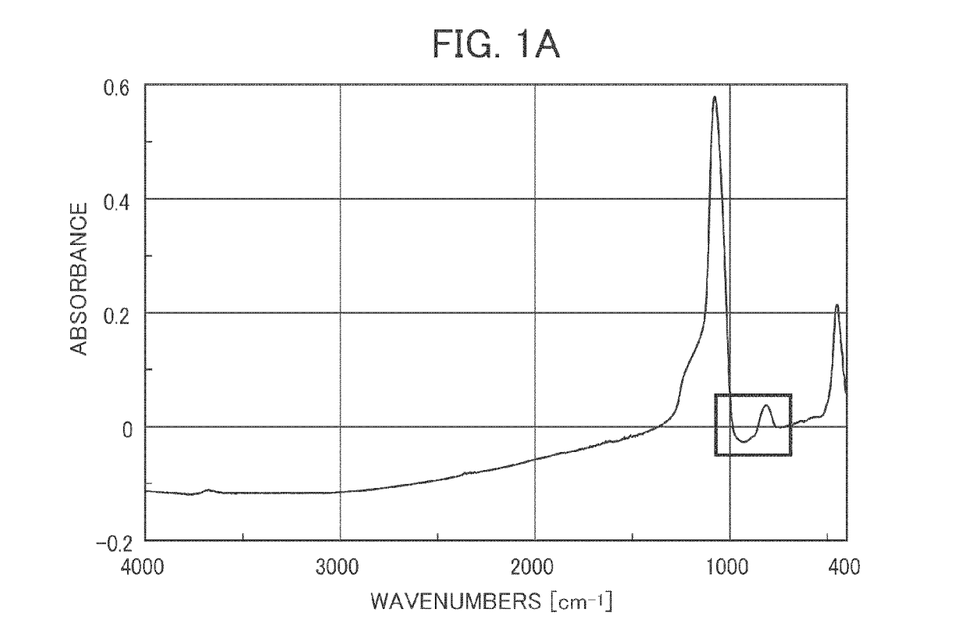
FIGS. 1A and 1B show FT-IR spectra of Example 1.
Figure 1B:
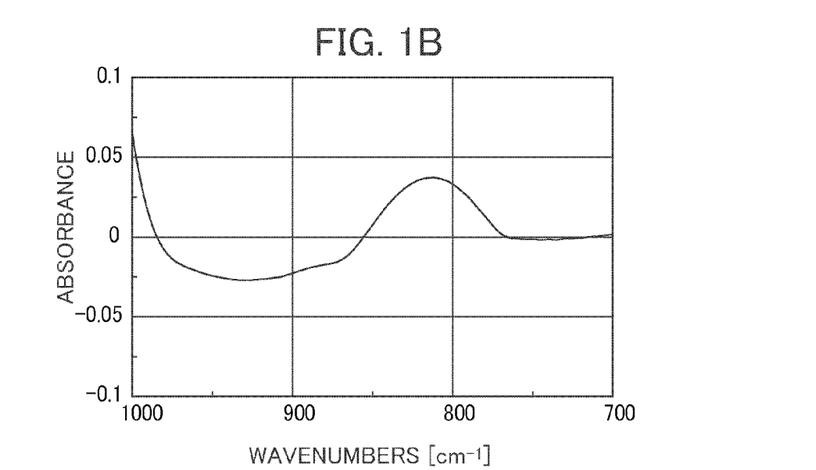
Figure 2A:
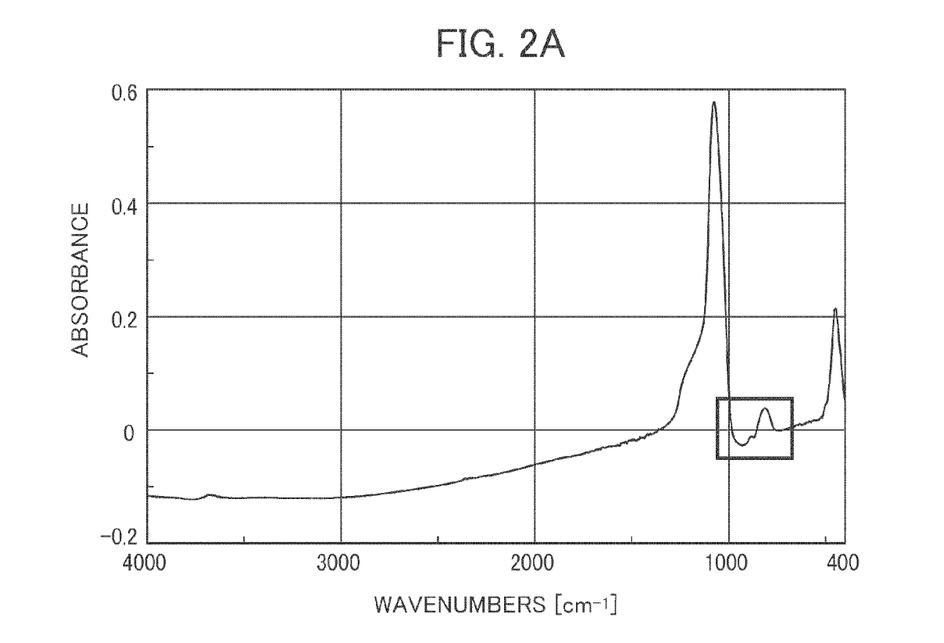
FIGS. 2A and 2B show FT-IR spectra of Comparative Example 1.
Figure 2B:
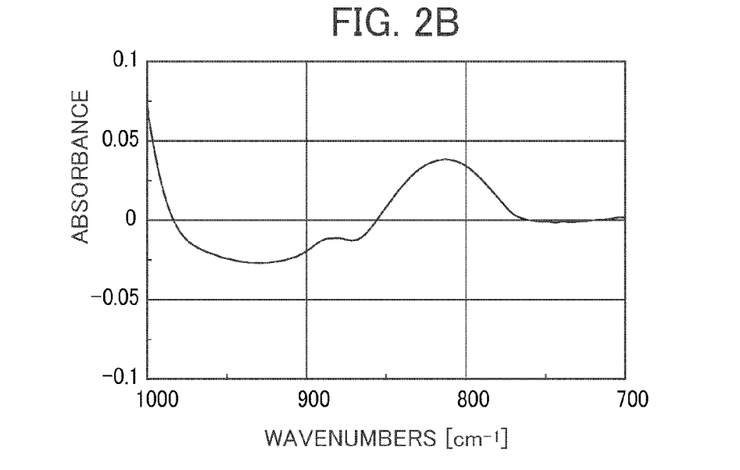
Figure 3A:
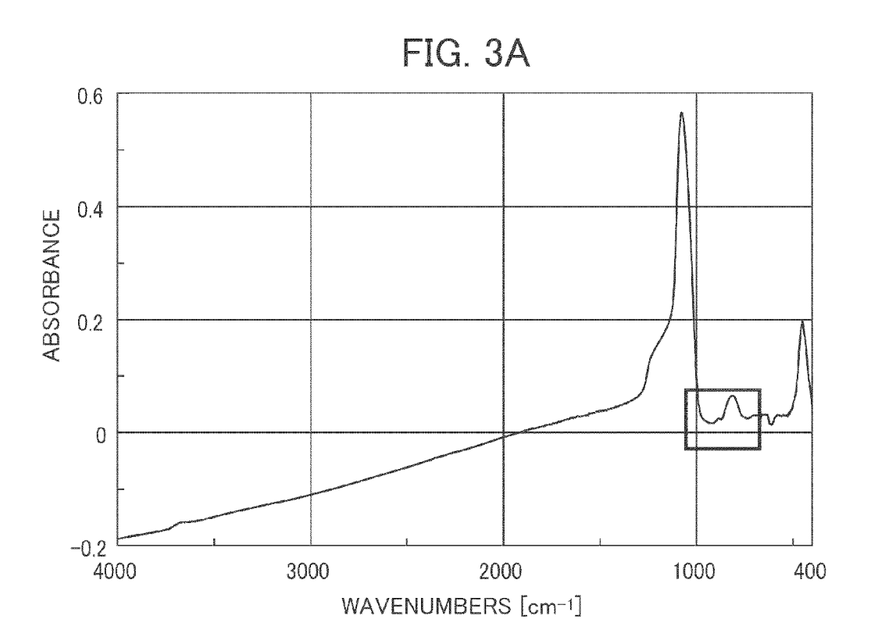
FIGS. 3A and 3B show FT-IR spectra of Comparative Example 2.
Figure 3B:
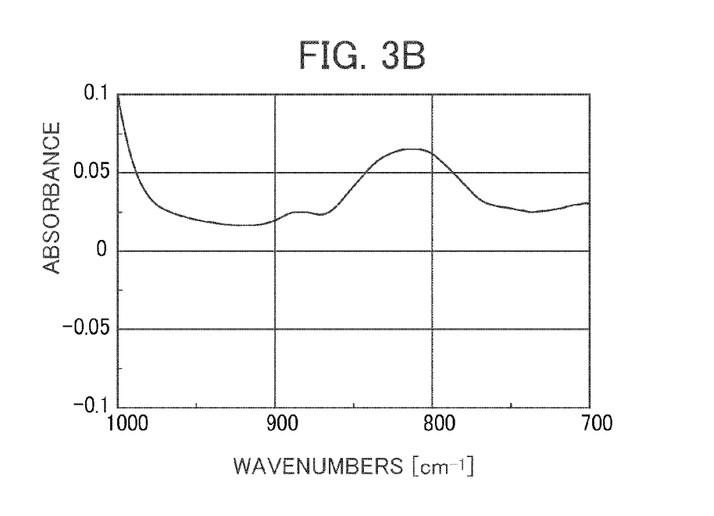

The film forming property was evaluated using FT-IR (FTIR-615 (trade name): manufactured by JASCO Corporation). Evaluation was made based on the peak areas of Si—H bonds of the applied films following the heating step, and the silica-based coating films of Example 1 and Comparative Example 1, respectively. In the FT-IR spectra, the peak around 880 cm$^{-1}$ represents the Si—H bond of interest. The FT-IR spectra of Example 1 are shown in FIGS. 1A and 1B. An enlarged drawing of the portion enclosed by a thick line in FIG. 1A is shown in FIG. 1B. The FT-IR spectra of Comparative Example 1 are shown in FIGS. 2A and 2B, and the FT-IR spectra of Comparative Example 2 are shown in FIGS. 3A and 3B. Also in FIGS. 2A, 2B, 3A and 3B, each enlarged drawing of the portion enclosed by a thick line in FIGS. 2A and 3A are shown in FIGS. 2B and 3B respectively, similarly to FIGS. 1A and 1B. It was noted that the peak of Si—H around 2250 cm$^{-1}$ was not confirmed from any of the FT-IR spectra.

As is clear from FIGS. 1A and 1B, the Example 1 in which the compound represented by the formula (I-d) was used exhibited no Si—H peak following the baking. To the contrary, as is clear from FIGS. 2A, 2B, 3A and 3B, the Comparative Example 1 in which the base generator (compound (I-d)) was not added, and the Comparative Example 2 in which the compound represented by the above formula (II) was used as the base generator exhibited peaks of Si—H following heat curing. It was ascertained that the Example 1 in which the compound (I-d) was used as the base generator formed a dense Si—O—Si network.

Figure 4:
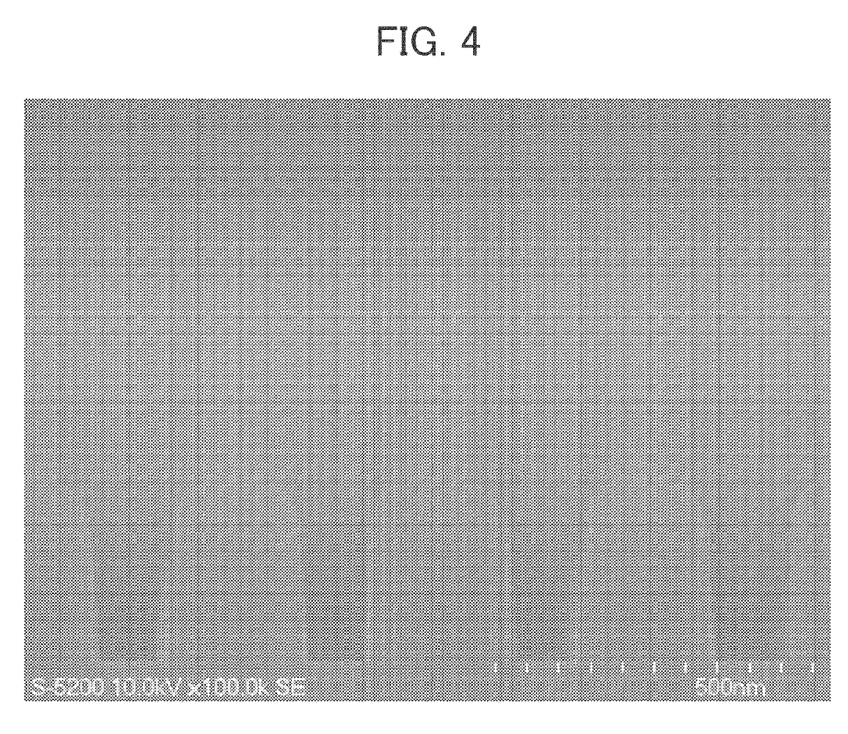
FIG. 4 shows an SEM image of a silica-based coating film formed at the groove bottom of Example 1.
Figure 5:
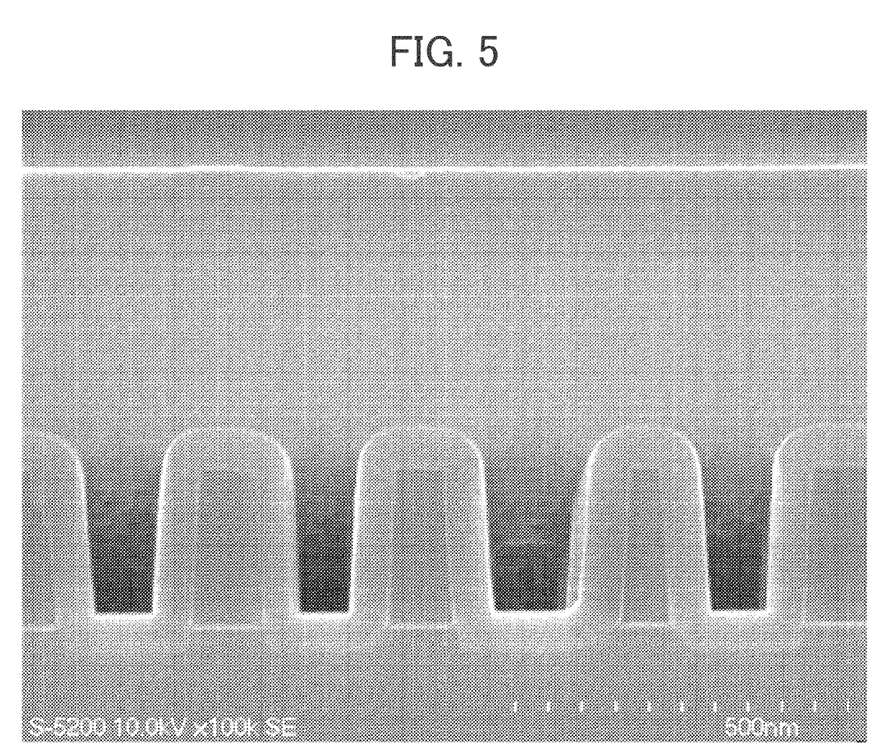
FIG. 5 shows an SEM image of a silica-based coating film formed at the groove bottom of Comparative Example 1.

Furthermore, with respect to the silica-based coating films of the above Example 1 and Comparative Example 1, resistance against buffered hydrofluoric acid (63BHF (trade name): manufactured by Stella Chemifa Corporation; a mixture of 6% by mass hydrofluoric acid and 30% by mass of ammonium fluoride) was studied for confirming the etching resistance of the silica-based coating films formed at the groove bottom after immersion under a condition of 25° C. for 3 sec in 63BHF, in a state in which a portion of the pattern was cut away to provide the cross section, following formation of the aforementioned silica-based coating film. The components included in the application liquids of Examples 1 to 4, and Comparative Examples 1 and 2, and evaluation results of the etching resistance of the silica-based coating film formed at the groove bottoms of Examples 1 to 4, and Comparative Examples 1 and 2 are shown in Table 1. The evaluation of the etching resistance was made on a four-grade rating of "A", "B", "C" and "D". A rating of "A" indicates an evaluation made for the case in which no void was found on the silica-based coating film at the groove bottom. A rating of "B" indicates an evaluation made for the case in which hardly any voids were found on the silica-based coating film at the groove bottom. A rating of "C" indicates an evaluation made for the case in which only a small void was found on the silica-based coating film at the groove bottom. A rating of "D" indicates an evaluation made for the case in which a large void was found on the silica-based coating film at the groove bottom. Moreover, an SEM image of the silica-based coating film formed at the groove bottom of Example 1 is shown in FIG. 4; and an SEM image of the silica-based coating film formed at the groove bottom of Comparative Example 1 is shown in FIG. 5. An SEM image of the silica-based coating film formed at the groove bottom of Comparative Example 2 is shown in FIG. 6.

As is clear from Table 1, Examples 1 to 4 in which the compounds represented by the formulae (I-d), (I-a), (I-i) and (I-k) were used as the base generator, respectively, exhibited superior etching resistance of the silica-based coating film formed at the groove bottom as compared with Comparative Example 1 in which the base generator (compound represented by the formula (I-d)) was not added, and Comparative Example 2 in which the compound represented by the above formula (II) was used as the base generator.

Figure 6:
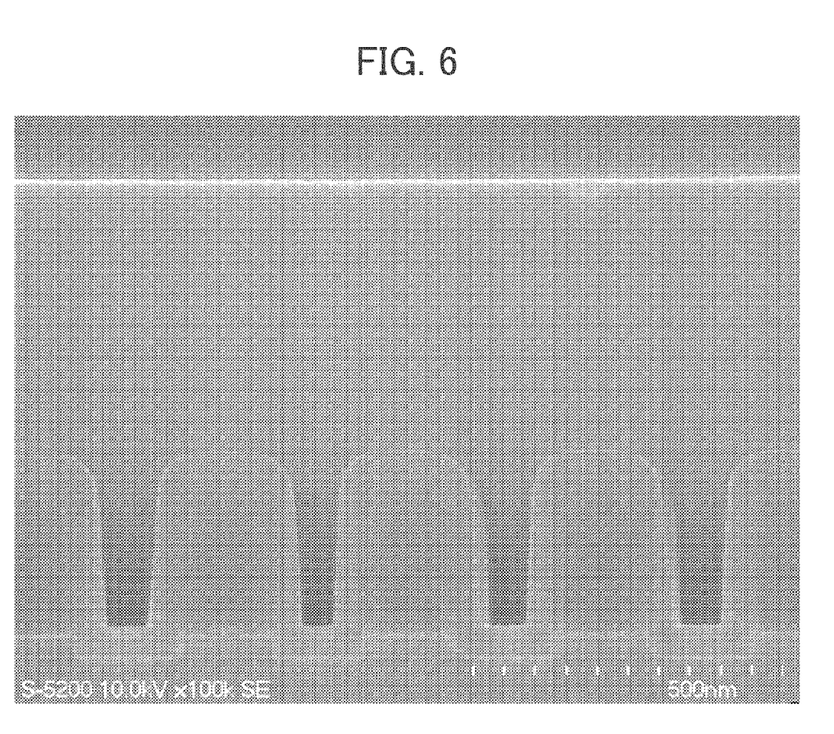
FIG. 6 shows an SEM image of a silica-based coating film formed at the groove bottom of Comparative Example 2.

As is clear from Table 1 and FIGS. 4 to 6, Example 1 in which the compound represented by the formula (I-d) was used as the base generator exhibited particularly superior etching resistance of the silica-based coating film formed at the groove bottom as compared with Comparative Example 1 in which the base generator (compound represented by the formula (I-d)) was not added, and Comparative Example 2 in which the compound represented by the above formula (II) was used as the base generator.

TABLE 1

| | Siloxane polymer | Base generator | Solvent | Etching resistance |
|---|---|---|---|---|
| Example 1 | OCD T-12 1500V | formula (I-d) (1%/SiO$_2$) | propylene glycol dimethyl ether | A |
| Example 2 | OCD T 12 1500V | formula (I-a) (1%/SiO$_2$) | propylene glycol dimethyl ether | B |
| Example 3 | OCD T 12 1500V | formula (I-i) (1%/SiO$_2$) | propylene glycol dimethyl ether | B |
| Example 4 | OCD T-12 1500V | formula (I-k) (1%/SiO$_2$) | propylene glycol dimethyl ether | B |
| Comparative Example 1 | OCD T-12 1500V | | propylene glycol dimethyl ether | D |
| Comparative Example 2 | OCD T-12 1500V | formula (II) (1%/SiO$_2$) | propylene glycol dimethyl ether | C |

What is claimed is:

1. An application liquid comprising (A) a siloxane polymer, and (B) a base generator represented by the following general formula (I):

(I)

wherein, $R^1$ and $R^2$ are a hydrocarbon group having 1 to 5 carbon atoms and which may be the same or different; or one of $R^1$ and $R^2$ is a hydrogen atom and the other is a hydrocarbon group having 1 to 5 carbon atoms; when $R^1$ and $R^2$ are both a hydrocarbon group, these may bind to one another to form a ring structure; $R^3$ is a bivalent linking group; and $R^4$ is a condensed ring selected from the group consisting of an anthracene ring, a thioxanthene ring, and an anthraquinone ring; wherein the condensed ring may contain a substituent selected from the group consisting of an alkyl group having 1 to 5 carbon atoms a hydroxy group, a nitro group, and an oxygen atom (=O).

2. The application liquid according to claim 1, wherein the $R^4$ is an anthracene ring.

3. The application liquid according to claim 1, wherein the content of the base generator (B) is 0.1 to 20% by mass in terms of an equivalent mass of $SiO_2$ of the siloxane polymer (A).

4. A method for formation of a silica-based coating film, the method comprising:
 applying the application liquid according to claim 1 on a substrate to form an applied film;
 heating the applied film; and
 baking the applied film after the heating step to form a silica-based coating film.

5. The method for formation of a silica-based coating film according to claim 4, further comprising irradiating an ultraviolet ray on the applied film, between the applying step and the heating step.

* * * * *